(12) United States Patent
Albrecht et al.

(10) Patent No.: US 7,273,551 B2
(45) Date of Patent: Sep. 25, 2007

(54) FUNCTIONALIZED POLYIMIDE MOLDED BODY AND FUNCTIONALIZED POLYIMIDE MEMBRANE

(75) Inventors: Wolfgang Albrecht, Teltow (DE); Lars-Ingemar Dahms, Berlin (DE); Karola Lützow, Berlin (DE); Thomas Weigel, Wilhelmshorst (DE); Roland Hilke, Teltow (DE); Dieter Paul, Kleinmachnow (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 109 days.

(21) Appl. No.: 10/662,166

(22) Filed: Sep. 8, 2003

(65) Prior Publication Data

US 2004/0082731 A1    Apr. 29, 2004

Related U.S. Application Data

(63) Continuation-in-part of application No. PCT/DE02/00077, filed on Jan. 12, 2002.

(30) Foreign Application Priority Data

Mar. 9, 2001    (DE) ................................ 101 11 665

(51) Int. Cl.
B01D 39/00    (2006.01)
B01D 67/00    (2006.01)
B01D 29/00    (2006.01)

(52) U.S. Cl. ............ 210/500.39; 210/490; 210/500.27; 264/48; 264/49

(58) Field of Classification Search ........... 210/500.37, 210/500.38, 500.39, 490, 500.23, 640, 645, 210/502.1; 264/48, 49; 96/4; 427/244, 427/333, 319.7; 428/308.4, 319.7; 95/45
See application file for complete search history.

(56) References Cited

U.S. PATENT DOCUMENTS

| | | | |
|---|---|---|---|
| 5,049,282 A * | 9/1991 | Linder et al. ................ 210/651 |
| 5,085,778 A * | 2/1992 | Reale, Jr. ................ 210/500.39 |
| 5,338,455 A * | 8/1994 | Koenhen et al. ............ 210/654 |
| 5,443,852 A * | 8/1995 | Shahidi et al. ................. 426/92 |
| 5,547,576 A * | 8/1996 | Onishi et al. .......... 210/500.37 |
| 5,700,559 A * | 12/1997 | Sheu et al. ............... 428/319.7 |
| 5,753,008 A * | 5/1998 | Friesen et al. ................. 95/45 |
| 5,914,182 A * | 6/1999 | Drumheller .............. 428/308.4 |
| 5,919,523 A * | 7/1999 | Sundberg et al. ........... 427/333 |
| 6,177,013 B1 * | 1/2001 | Thomas et al. ............. 210/650 |
| 6,260,715 B1 * | 7/2001 | Simard et al. .............. 210/490 |
| 6,716,270 B2 * | 4/2004 | Ding et al. .................... 95/45 |
| 6,851,561 B2 * | 2/2005 | Wu et al. ................... 210/490 |
| 7,040,756 B2 * | 5/2006 | Qiu et al. ............... 351/160 H |

* cited by examiner

Primary Examiner—Ana Fortuna
(74) Attorney, Agent, or Firm—Klaus J. Bach

(57) ABSTRACT

In a polyimide molded body, in particular a polyimide membrane which is functionalized with a chemical group and a method for production thereof, a molded body or membrane is obtained, whereby a pre-prepared polyimide body, as starting material, is brought into contact with an aqueous modifier solution for a period of 1 second to 1 hour. The modifier solution contains at least one modifier substance at least partially dissolved therein, which comprises a primary or secondary amino group, or a similar amino group and additionally at least one further functional group per molecule. The polyimide molded body is brought to an elevated temperature, either during the contact period with the modifier solution or thereafter and then purified and dried. The membrane obtained according to the invention may be functionalized in a targeted adjustable manner and has a high functionalization degree. The functionalization may be achieved simply and economically in an aqueous medium. The membranes obtained are suitable for use in the technical, biotechnological and medical fields and as starter membranes for the production of affinity membranes.

18 Claims, No Drawings

FUNCTIONALIZED POLYIMIDE MOLDED BODY AND FUNCTIONALIZED POLYIMIDE MEMBRANE

This is a continuation-in-part application of international application PCT/DE02/00077 filed Jan. 12, 2002 and claiming the priority of German application 101 11 665.9 filed Mar. 9, 2001.

BACKGROUND OF THE INVENTION

The invention relates to a polyimide molded body, particularly a polyimide membrane, which has been functionalized by a chemical group and to a method for the manufacture thereof.

Polyimides of different chemical compositions have been known and have been commercially available for a long time. Various molded bodies can be formed from such polyimides by casting. An important application field for polyimides resides for example in the manufacture of injection-molded bodies and of membranes.

Different types of polyimides can easily be formed into membranes with different separation properties by means of a phase inversion process. A method for the manufacture of integral symmetrical polyetherimide membranes is for example described in DE-A 34 20 373. These known membranes can be for example coated with polydimethylsiloxane and used for the separation of gases.

Another polyimide membrane and a method for the manufacture thereof are described in DE-A 37 16 916. This membrane is preferably used for the ultrafiltration and, as coated carrier membrane, for the manufacture of composite membranes.

Polyimides are generally relatively hydrophobic polymers, which cannot be easily wetted by water. The filtration of aqueous solutions leads to wetting problems and may result in a non-specific adsorption of compounds in the solution (fouling) which causes a substantial reduction in the membrane efficiency. U.S. Pat. No. 4,798,847 discloses a process for the manufacture of polyimide membranes, wherein a hydrophilic compound is added to the hydrophobic base polymer, particularly polyvinyl pyrolidon, which is cross-linked and in this way fixed to the membrane and which remains therefore at least partially in the finished membrane. Such hydrophilically modified polyimide membranes are suitable for ultra and/or micro-filtration.

However, polyimide membranes generally do not include any active functional groups as for example aminhydroxyl, carboxyl, aldehyde and other reactive groups do. As a result, these known polyimide membranes are not suitable for the manufacture of affinity membranes. Polyimides include generally components, which can be functionalized. The chemical conversions required for the introduction of functionalized groups however are time-consuming and cannot be performed continuously or are difficult to be performed continuously or they present health hazards or they damage functionalized membranes.

However, DE-A 41 17 501 discloses the use of an amino-modified polyimide membrane, which can be used for gas separation and for ultra-filtration processes. The manufacture of this membrane is based on a homogeneous polyimide solution, into which an organic multifunctional compound with at least two primary amino groups per molecule are introduced in a concentration of 0.05 to 5% of the reaction mixture and which is dissolved therein. This mixture of substances is then left to react for 1 hour to 10 days, wherein, with the practically complete consumption of the amino groups of the organic multi-functional compounds, the polyamide macro-molecules are branched and cross-linked such that the viscosity of the polyimide solution is increased. However, it has been found that the amount of modifying amino compounds in the homogeneous solution must be very accurately controlled, that is, depending on the amino-compound utilized, it must be relatively small in order to obtain soluble polymer solutions. With an overdose, the homogeneous solution forms an insoluble gel. This membrane forming polymer solution is suitable for forming membranes also from diluted polymer solutions without this solution penetrating a textile support structure. Since the amino-containing modifications react while consuming all amino-functions, the content of free amino-groups at the surface of the membrane formed is very low, that is practically zero, so that the membrane in this form, that is, with the use of the rest amino groups possibly present, is not suitable.

It is the object of the present invention, to provide a functionalized polyimide molded body, and particularly a functionalized polyimide membrane, which can be functionalized in a controlled manner and which has a high functionalization degree. It is further an object of the invention to provide a method for the manufacture of such a polyimide molded body or such a polyimide membrane, wherein this functionalization occurs in a simple and economic manner in an aqueous medium.

SUMMARY OF THE INVENTION

In a polyimide molded body, in particular a polyimide membrane, which is functionalized with a chemical group and a method for the production thereof, a molded body or membrane is obtained, whereby a pre-prepared polyimide body, as starting material, is brought into contact with an aqueous modifier solution for a period of 1 second to 1 hour. The modifier solution contains at least one modifier substance at least partially dissolved therein, which comprises a primary or secondary amino group, or a similar amino group and additionally at least one further functional group per molecule. The polyimide molded body is brought to an elevated temperature, either during the contact period with the modifier solution or thereafter and then purified and dried. The membrane obtained with the method according to the invention may be functionalized in a targeted adjustable manner and has a high functionalization degree. The functionalization may be achieved simply and economically in an aqueous medium. The membranes obtained as above find application in many functions in the technical, biotechnological and medical fields and as base membranes for the production of affinity membranes.

The molded bodies or membranes according to the invention can be used in the functionalized form directly for many applications in the technical, biotechnological and medical fields and, in the form of functionalized membranes, they can be used as base membrane for the manufacture of affinity membranes.

Below the invention will be described in detail in the form of a polyimide membrane representing polyimide molded bodies.

The polyimide membrane according to the invention can be obtained from a previously manufactured polyimide membrane, which, basically, is known. The polyimide membrane is contacted by an aqueous modifier solution in which at least one modifier substance is dissolved. The modifier substance includes at least one amino group per molecule of the modifier substance and possibly additionally at least one further functional group for each molecule of the modifier substance. In other words, each modifier substance includes on one hand a primary or secondary amino group and, on the other hand, an additional functional group. However, the additional functional group may also be such an amino group.

The polyimide membrane temperature is increased when being contacted by the modifier solution or afterwards. Subsequently, it is cleaned and dried.

The polyimide membrane is contacted by the modifier solution for a period of 1 sec to 1 hour, preferably for 5 seconds to 10 minutes. At the same time, or afterwards, the polyimide membrane is heated for a period of 1 second to 1 hour, preferably, 5 seconds to 10 minutes, to a temperature of 50°-100° C., preferably 70-90° C., whereby it is conditioned.

From the polyimide bodies functionalized in this manner, materials which do not form molded bodies or membranes, with the exception of water and auxiliary materials of the contacting modifier solution and/or other treatment solutions, are preferably removed by washing, extracting and similar procedures.

The cleaned membrane is then dried. But before the drying, it may also be impregnated with substances, which maintain the pores.

The concentration of the modifier substance or, respectively, the modifier substances in the modifier solution is preferably 0.1-20 wt % and preferably 1-10 wt %. The functionalized polyimide membrane obtained in this way may subsequently be treated with additional treatment solutions which are known as such, for example, in order to transfer a function of the moderator substance present in the form of salt into an acid or in order to transfer a neutral function for example in order to transfer a function of the modifier substance present in the form of salt into an acid or in order to transfer a neutral function for example by quartation into an ionic form.

The polyimide membrane according to the invention is functionalized depending on the type of the modifier substance or substances used and generally is a porous membrane with a large content of functional groups.

The membrane according to the invention can be used already in this form as an adsorption membrane. In addition, the functional groups, which are controllably adjustable and which, depending on the reaction control, are normally freely available in large numbers on the membrane and pore surfaces, can be used for follow-up reactions for the coupling of additional selective or specific adsorbing functions. In the case of polyimide molded bodies, these functional groups are present primarily on the molded body surface. In porous membranes, the functional groups are—depending on the process control—distributed uniformly or asymmetrically over the membrane cross-section, which will be discussed in greater detail later.

With the selection of the pore size of the polyimide membrane used as the base membrane which is to be modified and the size of the molecule of the modifier substance in the modifier solution, using a dry polyimide membrane and preferably short treatment periods, the penetration of the modifier substance into the substructure of the membrane can be controlled such that an asymmetric distribution of the functional groups over the membrane cross-section is obtained. Therefore, preferably, an asymmetric polyimide membrane is used as the base membrane, or respectively, as the membrane to be modified. The pore size of the polyimide membrane serving as starter membrane is, in the separation-active layer preferably smaller than the molecules of the modifier substance. This means, in other words, that a membrane is used as starter membrane or starter material, which provides for a substantial retention with respect to the molecules of the modifier substance. Such a membrane is contacted by the modifier solution preferably from the backside thereof.

With the use of an asymmetric membrane, which is treated from the substructure side as described above, a decreasing pore size is consequently concurrent with a decreasing number of freely available functions. The highest number of freely available functions is therefore at the membrane surface, which is in direct contact with the modifier solution during modification.

In another preferred embodiment, an asymmetric distribution of the functional groups over the membrane cross-section can be obtained in that—in contrast to the above described variant, wherein generally a dry polyimide membrane is used—the pore system of the dry polyimide membrane is filled with a well-wetting, preferably aqueous, solution before the polyimide membrane is contacted by the modifier solution. In connection with short contact times of the polyimide membrane in the modifier solution, in this case, the contacted membrane surface and the adjacent membrane cross-sectional structure are modified independently of the structure of the polyimide membrane and apparently without retention of the polyimide membrane with regard to the molecules of the modifier substance. In this way, an asymmetric modification of the polyimide membrane is also achieved.

If modifier substances with hydrophilic functional groups are used, the so modified polyimide membrane also has advantageously a smaller under-water contact angle. As a result, this modified membrane is easier wetted and has a lower tendency of fouling and a lower non-specific adsorption of compounds in solution which are to be separated as well as fewer core blockages. On the other hand, with a controlled selection of hydrophilic groups, the underwater contact angle can also be increased if a functionalization time of less than 60 seconds is selected, so that membranes modified in this manner can advantageously be used for the controlled adsorption of hydrophilic substances from aqueous media.

If reference is made herein to a polyimide, a polyimide molded body or a polyimide membrane, the term "polyimide" is intended to include, in addition to the pure polyimides, also such classes of compounds, which include other groups in addition to the imide groups. Included are, for example, poly(amid-imide), poly(ester-imide), poly(ether-imide) and mixed products (polymer blends). In accordance with the invention, it is only necessary that at least a part of the molded body— or membrane—forming polymer(s) include imide groups in the polymer chain. Consequently, any membrane, which includes these imide functions can be functionalized by means of the modification according to the invention. However, preferably molded bodies or, respectively, membranes of pure polyimides are utilized. A molded body may have any shape. It is only necessary that it can be brought into contact with the treatment solution. As base membranes, any type of membranes can be used. It may be a hollow or hose membrane or a flat membrane with or without support fleece.

The modifier substances used in accordance with the invention include at least one primary or secondary amino group. If the modifier substance includes only one amino group and otherwise consists of a hydrocarbon rest, the hydrocarbon rest can be considered quasi as additional functional group. If such a monoamine is used for modification, the hydrophobic properties of the membrane so modified can be improved.

The modifier substances used in accordance with the invention are preferably of the following general formula:

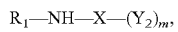

wherein $R_1$ is a hydrogen atom or an aliphatic or aromatic hydrocarbon rest with up to 6 C atoms, $Y_1$ is a hydrocarbon rest with 6 or more C atoms, $Y_2$ is a —$NH_2$—, —$NHR_1$—, —$NH(R_2)_2$—, —OH—, —$CH_2OH$—, —CO(OH)—, —$SO_2(OH)$— or —$PO_3(OH)$— group or fluorinated group, wherein $R_2$ is an aliphatic or aromatic hydrocarbon rest of any type, and represents particularly $R_1$, X is a straight line or branched hydrocarbon rest which interconnects the $R_1$—NH— group and the $(Y_2)$— group or groups which may be connected at the ends or the side of the chain and which may be interrupted in a side chain or in the main chain or by one or several O— or N— hetero-atoms, and wherein n is 1 or 2 and m=1, 2, or 3.

The divalent group X, which connects the amino group with another functional group $Y_2$ linearly or by way of ring systems, may therefore be of any type. Preferably, it is an aliphatic and/or aromatic hydrocarbon rest, which may include the hetero-atoms mentioned and which may additionally include CO—, C(OH)—, CO(OH)—, and $PO_3(OH)$ groups. Particularly X groups with amine- or ether groups may be used in the vicinity of short-chain, aliphatic hydrocarbon chains with a high content of the hetero-atoms from the substance class of the polyamines, such as polyethylene imine or, respectively, ethoxylated amines/polyamines.

In a preferred embodiment, the modifier substances used in accordance with the invention have the following general formula:

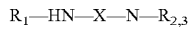

The rests $R_1$ and X have the above definitions. The rests $R_2$ and $R_3$ indicate, independently of each other, each a hydrogen atom or an aliphatic or an aromatic hydrocarbon rest.

The modifier substances used for the modification must be dissolvable at least partially in the solvent used for the preparation of the modifier selection. Preferably, the modifier substances are completely soluable in the solvent or, respectively, the solvent mixture of the modifier solution and form homogeneous, generally low viscosity solutions whose pH value is ≧7. As solvent, normally water is used. For a uniform short-time treatment, it is advantageous to use aqueous solvents with a content of short-chain mono- or polyfunctional alcohols, which are fully mixable with water. The content of these alcohols is 10 to 90 wt % and preferably 20-50 wt % in the solvent mixture for the modifier substance or substances.

The invention will be described below in greater detail on the basis of examples for the manufacture of modified polyimide membranes, wherein di-or respectively, polyamines are used as modifier substances. However, the modified amines are used only in an exemplary fashion for the explanation of the principle of the invention for obtaining the modified polyimide bodies or polyimide membranes. The polyimide used in the examples is Ultem 1000 (General Electric Co.), from which planar membranes were formed in a known manner on a Histar carrier material.

For the characterization of the start-out or base membrane and the membrane modified in accordance with the invention, its water permeability and pore characteristics with water or, respectively, with the use of a mixture of dextrons were measured and, in selected cases, the content of functional groups was determined by titrometry. For the determination of the asymmetry of the functionalization, a qualitative coloring test using orange II (Uchida et al., Langmuir 9 (1993) 1121-1124) was used.

EXAMPLE 1 (COMPARISON EXAMPLE)

Commercially available planar membranes (manufacturer: GKSS Forschungszentrum Geesthacht GmbH) from polyether imide (Ultem 1000, General Electric) on Histar 80 were used as base membranes for the modification. Membranes manufactured differently and with different separation properties had in this unmodified form the following characteristic data:

| Planar membrane 1: | |
|---|---|
| Water permeability: | 0.75 l/m² hkPa |
| Average pore size | 2.64 nm |
| Cut-off | 23.2 kg/mol |
| Amount of polymer/cm² membrane area | 4.178 × 10⁻³ g/cm² |
| Contact angles: advancing angle | 82°-86° |
| retraction angle | 52-57° |

| Planar membrane 2: | |
|---|---|
| Water permeability: | 2.43 l/m² hkPa |
| Average pore size | 2.58 nm |
| Cut-off | 70.4 kg/mol |
| Amount of polymer/cm² membrane area | 4.578 × 10⁻³ g/cm² |
| Contact angles: advancing angle | 82°-86° |
| retraction angle | 52°-57° |

Furthermore, a hollow membrane was used for the examinations. This hollow membrane was prepared as follows: From a polyether amide spinning solution, using water (room temperature) as lumina-filler and a mixture of 45 parts of dimethyl formamide (DMF), 25 parts N-methylpyrolidon (NMP), 25 parts gamma-butyl acetone (GBL) and 5 parts of water as precipitation bath, by means of a wet spinning procedure a hollow membrane was spun. The pore system of the outer surface of this suitably gel-moist hollow membrane was opened by gel/sol/gel treatment (1. Bath: N-methylpyrrolidone, 30° C.; 2. bath: water 80°). A highly asymmetric hollow membrane is formed with an inner separation-active layer. After washing out of the non-membrane forming components with water the hollow membrane was dried at room temperature. The base hollow membrane formed in this way (hollow membrane 1) had, in the unmodified state, the following characteristic data:

| | |
|---|---|
| Water permeability: | 2.37 l/m² hkPa |
| Average pore size | 3.23 nm |
| Cut-off | 20.3 kg/mol |
| Contact angles: advancing angle | 82°-86° |
| retraction angle | 52-57° |

The characteristic data of the base membrane were used for the evaluation of membrane properties resulting from the modification.

EXAMPLE 2

The planar membrane 1 examined in the comparison example was mounted in a dried state on a metal drum and contacted from the active side thereof with a modifier solution consisting of 2 parts 1.6 di-aminohexane, 49 parts water and 49 parts 1—propanol at 75° C. for 30 seconds. The unmodified membrane has no retention with respect to the 1.6-diamino hexane used as modifier substance. After the modification reaction the membrane was washed thoroughly with water at room temperature in order to remove any modifier substances not co-valently bonded to the membrane. This modified membrane was examined in the moist state with regard to its separation properties and, after drying, with respect to its content of free amino groups. The membrane modified in this manner had the following characteristic data:

| Water permeability: | 1.43 l/m² hkPa |
|---|---|
| Average pore size | 3.5 nm |
| Cut-off | 156 kg/mol |
| Amine content | 0.0391 mmol/g polymer |
| Contact angles: advancing angle | 82°-86° |
| retraction angle | 45° |

This distribution of the modifier substance over the membrane cross-section corresponded to the qualitative estimation by means of the coloring test symmetrically.

EXAMPLE 3

The base membrane described in example 1 (planar membrane 1) was modified in accordance with example 2 with the following differences:
- the modifier solution consisted of 2 parts polyethylene imine (molecular weight 700 g/mol), 49 parts water and 49 parts 1-propanol, and
- the treatment was performed for 60 sec.

The unmodified membrane has only a small (practically no) retention (<5%) with respect to the modifier substance.

The following characteristic data were determined for the modified membrane:

| Water permeability: | 1.37 l/m² hkPa |
|---|---|
| Average pore size | 2.85 nm |
| Cut-off | 21.9 kg/mol |
| Amine content: | 0.0273 mmol/g polymer |

The distribution of the modifier substance over the membrane cross-section was symmetric in accordance with the qualification estimation by means of the coloring test.

EXAMPLES 4-7

The membrane described in the example 1 (planar membrane 1) was modified in accordance with these examples however with the following differences:

1. The modifier solution consisted of 4 parts of a 50% polyethyleneimine solution in water (molecular weight: 750,000 g/mol), 47 parts water and 49 parts 1-propanol. The unmodified membrane has practically a full retention with respect to the modifier substance (>95%).
2. The membrane was contacted from the support side with the modifier solution for different periods at 70° C.

The membranes modified in this manner had the characteristic data as presented in table 1:

TABLE 1

Characteristic data of the membranes modified according to the example 4-7

| Example | Treatment period (sec) | Water permeability l/m²hkPa | Average pore size (nm) | Cut-off (kg/mol) | Amine content (mmol/g polymer) |
|---|---|---|---|---|---|
| 1 comparison | 0 | 0.75 | 2.64 | 23.2 | 0 |
| 4 | 5 | 0.41 | 1.74 | 12.9 | 0.o32 |
| 5 | 30 | 0.21 | 1.08 | 7.5 | 0.041 |
| 6 | 600 | 0.20 | 0.80 | 6.2 | 0.047 |
| 7 | 1200 | 0.10 | 0.68 | 3.5 | 0.060 |

In the coloring test, it was found that the active layer of the membrane is clearly less colored and therefore became less functionalized than the support side. The contact angles measured at the active layer were practically identical with the corresponding data of the unmodified membrane.

EXAMPLES 8 to 10

The base membrane as used in example 3 was modified in accordance with example 2 with a modifier solution consisting of 2 parts 1,6— diaminohexane, 49 parts water and 49 parts 1-propanol with the following differences, such that
- the base membrane was fully wetted before being contacted by the modifier solution, with the modification solvent consisting of 50 parts water and 50 parts 1-propanol, and was used in this condition for the modification.
- the membrane was contacted from the support side by the modifier solution for different periods at 70° C.

The membrane so modified had the characteristic data as shown in table 2.

TABLE 2

Characteristic data of the membranes modified in accordance with the examples 8 to 10:

| Example | Treatment period (sec) | Water permeability l/m² hkPa | Average pore size (nm) | Cut-off (kg/mol) |
|---|---|---|---|---|
| 1 comparison | 0 | 2.43 | 2.58 | 10.4 |
| 8 | 30 | 2.26 | 2.75 | 35.4 |
| 9 | 300 | 1.50 | 3.34 | 33.7 |
| 10 | 600 | 1.80 | 3.12 | 52.4 |

During the coloring test, it was found that the active layer of the membrane was noticeably less colored and therefore less functionalized than the support side. The advance and retraction contact angle of this modified membrane measured at the active side was practically identical with the corresponding angles of the unmodified base membrane.

EXAMPLES 11 to 14

The inner layer-active dry PEI membrane described above was formed to a tube bundle mini module. The outer compartment of the module was filled with the modifier solution consisting of a 50% polyethylene imine solution in water (molecular weight: 750,000 g/mol) water and 1-propanol with different polyethylene imine contents. The module prepared in this manner was subjected in a drying chamber for 10 minutes to a temperature of 70° C. After removal of the modifier solution, both compartments of the hollow membrane of the module were flushed thoroughly with water. For the modification treatment solutions with different modifier elements were used. The hollow membrane functionalized in this manner was examined with regard to the amine contents, which could be determined titrimetrically (table 3) and, for selected examples with respect to the separation properties of the hollow membrane (table 4).

TABLE 3

| E)xample | Moifier content | Amine content (mmol/g polymer) |
|---|---|---|
| 1 (exit) | — | 0 |
| 11 (comparison | 0 | 0 |
| 12 | 0.5 | 0.0684 |
| 13 | 1 | 0.0735 |
| 14 | 2 | 0.0788 |

TABLE 4

| Example | Water flow Ml/m² hkPa | Average pore size (mm) | Cut-off (kDa) |
|---|---|---|---|
| 1 (Exit) | 2370 | 3.23 | 20.3 |
| 11 (comparison) | 1740 | 2.44 | 8.3 |
| 12 | 405 | 2.85 | 10.7 |
| 14 | 710 | 3.96 | 18.4 |

What is claimed is:

1. A polyimide body co-valently functionalized directly by a chemical group with which the polyimide body has been contacted for a period of 1 second to 1 hour using an aqueous modifier solution including at least partially dissolved therein a modifier substance, which comprises one of a primary and a secondary amino group and additionally at least one further functional group per molecule, said polyimide body being subjected to an increased temperature after having been contacted by the modifier solution and being subsequently cleaned and dried, said modifier substances having the general formulas

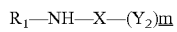

wherein $R_1$ is a hydrogen atom or an aliphatic or aromatic hydrocarbon rest with up to 6 C atoms, $Y_1$ is a hydrocarbon rest with at least 6 C atoms, $Y_2$ is one of a —$NH_2$—, —$NHR_1$—, $NH(R_2)_2$—, —OH—, —$CH_2OH$—, —CO(OH)—, —$SO_2(OHH)$—, —$PO_3(OH)$— group and a fluorized group, wherein $R_2$ is one of an aliphatic and aromatic hydrocarbon rest and particularly represents $R_1$, X is one of a straight chain or branched hydrocarbon rest which interconnects the $R_1$—NH— group and the $Y_2$ group or groups which may be bound to the ends or sides of a chain and which may be interrupted in a side chain or the main chain by at least one O or N heteroatom, n represents 1 or 2, and m represents 1, 2, or 3.

2. A polyimide body according to claim 1 generated by at least one of the following procedures: the polyimide body is contacted for 5 to 10 minutes by said modifier solution, the polyimide body is heated to a temperature of 50 to 100° C. for 1 sec to 1 hour and the polyimide body is cleaned by washing with water or by extraction.

3. A polyimide body according to claim 2, wherein the polyimide body is contacted by said modifier for 5 seconds to 10 minutes and heated to a temperature of 70 to 90° C.

4. A polyimide body according to claim 1, wherein the concentration of the modifier substance or substances in the modifier solution is 0.1 to 20 wt %.

5. A polyimide body according to claim 1 in the form of a polyimide membrane, wherein as base material an asymmetric polyimide membrane is used.

6. A polyimide body according to claim 5, wherein said asymmetric polyimide membrane has a pore size in its separation active layer, which is smaller than a molecule of the modifier substance.

7. A polyimide body according to claim 5, wherein said polyimide membrane has a support side and said membrane is contacted by the modifier solution from the support side thereof.

8. A polyimide body according to claim 5, wherein the asymmetric polyimide membrane is a dry polyimide membrane.

9. A polyimide body according to claim 5, wherein the base polyimide membrane is a polyimide membrane having a pore system filled with a well wetting aqueous solution.

10. A method for the manufacture of a polyimide body including a polyimide membrane co-valently directly functionalized by a chemical group, comprising the steps of: contacting the polyimide body for a period of 1 second to 1 hour with an aqueous modifier solution including, at least partially dissolved therein, a modifier substance which comprises one of a primary and a secondary amino group and at least one further functional group per molecule, subjecting said polyimide body to a temperature of 50 to 100° C. for 1 second to 1 hour after having been contacted by the modifier solution and then cleaning and drying the polyimide body, said modifier substances having the general formulas

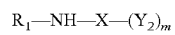

wherein $R_1$ is a hydrogen atom or an aliphatic or aromatic hydrocarbon rest with up to 6 C atoms, $Y_1$ is a hydrocarbon rest with at least 6 C atoms, $Y_2$ is one of a —$NH_2$—, —$NHR_1$—, $NH(R_2)_2$—, —OH —, —$CH_2OH$—, —CO(OH)—, —$SO_2(OHH)$—, —$PO_3(OH)$— group and a fluorized group, wherein $R_2$ is one of an aliphatic and aromatic hydrocarbon rest and particularly represents $R_1$, X is one of a straight chain or branched hydrocarbon rest which interconnects the $R_1$—NH— group and the $Y_2$ group or groups which may be bound to the ends or sides of a chain and which may be interrupted in a side chain or the main chain by at least one O or N heteroatom, n represents 1 or 2, and m represents 1, 2, or 3.

11. A method according to claim 10, wherein the polyimide body is a polyimide membrane.

12. A method according to claim 10, wherein the concentration of the modifier substance in the modifier solution is 1 to 10 wt %.

13. A method according to claim 10, wherein the concentration of the modifier substance or substances in the modifier solution is 0.1 to 20 wt %.

14. A method according to claim 10, wherein the polyimide membrane is an asymmetric polyimide membrane.

15. A method according to claim 14, wherein the polyimide membrane has a pore size which is smaller than a modifier substance molecule.

16. A method according to claim 14, wherein said polyimide membrane has a support side and said membrane is contacted by the modifier solution from the support side thereof.

17. A method according to claim 14, wherein the asymmetric polyimide membrane a dry polyimide membrane.

18. A method according to claim 14, wherein as base polyimide membrane a polyimide membrane having a pore system filled with a well wetting aqueous solution is used.

* * * * *